United States Patent [19]

Weder et al.

[11] Patent Number: 5,535,548
[45] Date of Patent: *Jul. 16, 1996

[54] APPARATUS FOR PROVIDING A DECORATIVE COVER FOR A FLOWER POT USING A COLLAR

[75] Inventors: Donald E. Weder, Highland, Ill.; Franklin J. Craig, Valley Park, Mo.; William F. Straeter, Breese; Joseph G. Straeter, Highland, both of Ill.

[73] Assignees: The Family Trust U/T/A; Southpac Trust International, Inc., both of Highland, Ill.

[ * ] Notice: The term of this patent shall not extend beyond the expiration date of Pat. No. 5,077,937.

[21] Appl. No.: 438,451

[22] Filed: May 10, 1995

Related U.S. Application Data

[62] Division of Ser. No. 380,904, Jan. 30, 1995, which is a division of Ser. No. 43,506, Apr. 6, 1993, which is a division of Ser. No. 773,474, Oct. 9, 1991, Pat. No. 5,231,794, which is a division of Ser. No. 404,955, Sep. 8, 1989, Pat. No. 5,077,937, which is a continuation-in-part of Ser. No. 365,767, Jun. 13, 1989, abandoned, and Ser. No. 327,996, Mar. 21, 1989, Pat. No. 4,901,423, which is a continuation of Ser. No. 232,541, Aug. 11, 1988, Pat. No. 4,835,834, which is a continuation of Ser. No. 876,405, Jun. 20, 1986, abandoned.

[51] Int. Cl.[6] .................................................. A01G 9/02
[52] U.S. Cl. ...................................................... 47/72; 47/66
[58] Field of Search ................................ 47/72, 66 SC; 206/423

[56] References Cited

U.S. PATENT DOCUMENTS

| 524,219 | 8/1894 | Schmidt | 229/89 |
|---|---|---|---|
| 950,785 | 3/1910 | Pene | 229/90 |
| 1,063,154 | 5/1913 | Bergen | 229/89 |
| 1,924,926 | 8/1932 | Gray | 65/53 |
| 2,355,559 | 8/1944 | Renner | 47/72 |
| 3,962,503 | 6/1976 | Crawford | 428/40 |
| 4,773,182 | 9/1988 | Weder et al. | 47/72 |
| 4,801,014 | 1/1989 | Meadows | 47/72 |
| 4,835,834 | 6/1989 | Weder et al. | 29/525 |
| 4,980,209 | 12/1990 | Hill | 428/34 |
| 5,073,161 | 12/1991 | Weder et al. | 493/154 |
| 5,077,937 | 1/1992 | Weder | 47/72 |

FOREIGN PATENT DOCUMENTS

| 5-42958 | 4/1975 | Japan | 206/423 |
|---|---|---|---|
| 560532 | 2/1972 | Switzerland | 229/8701 |
| 5127 | of 1882 | United Kingdom | 229/89 |

OTHER PUBLICATIONS

Exhibit A–Highland Supply Corporation 1989 Brochure entitled Speed Cover.

*Primary Examiner*—Henry E. Raduazo
*Attorney, Agent, or Firm*—Dunlap & Codding

[57] ABSTRACT

Apparatus for providing a decorative cover for a flower pot comprising a collar wherein the collar clamps a sheet of material to the flower pot or wherein the sheet of material is connected to the collar and the collar is connectable to the flower pot.

2 Claims, 5 Drawing Sheets

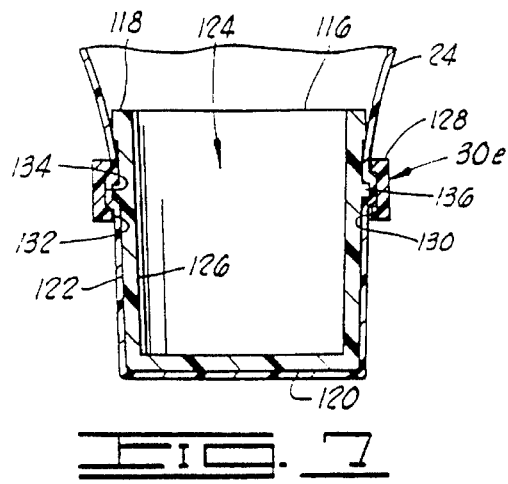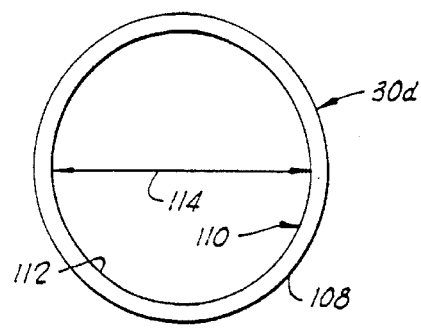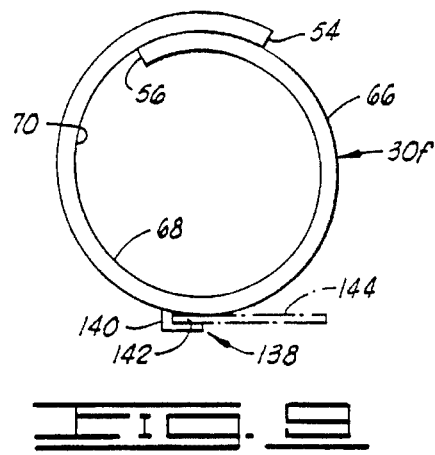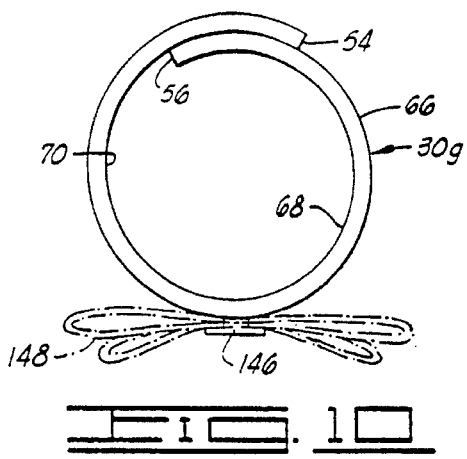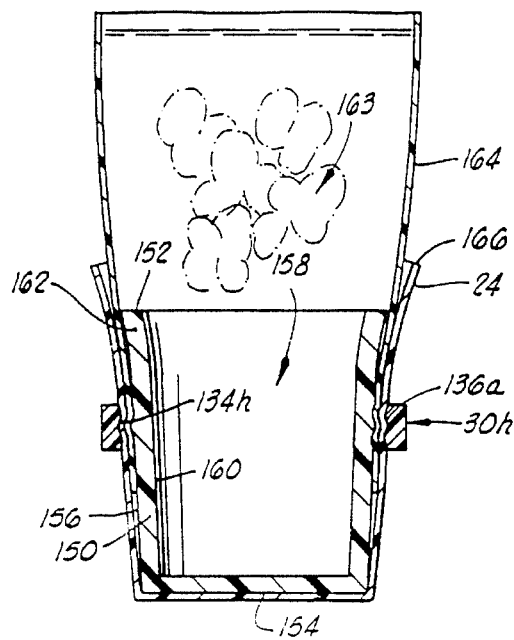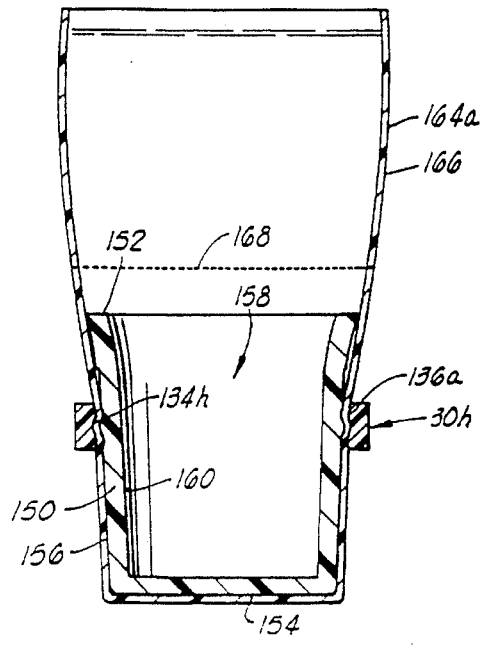

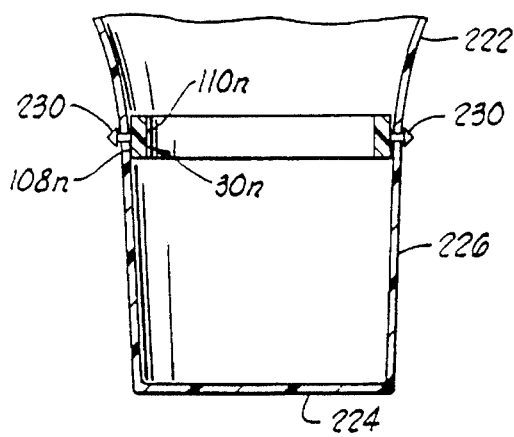
Fig. 22
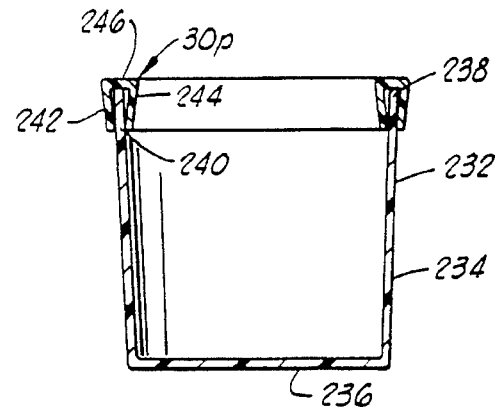
Fig. 23
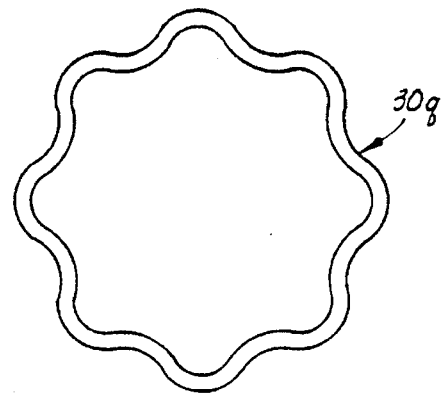
Fig. 24
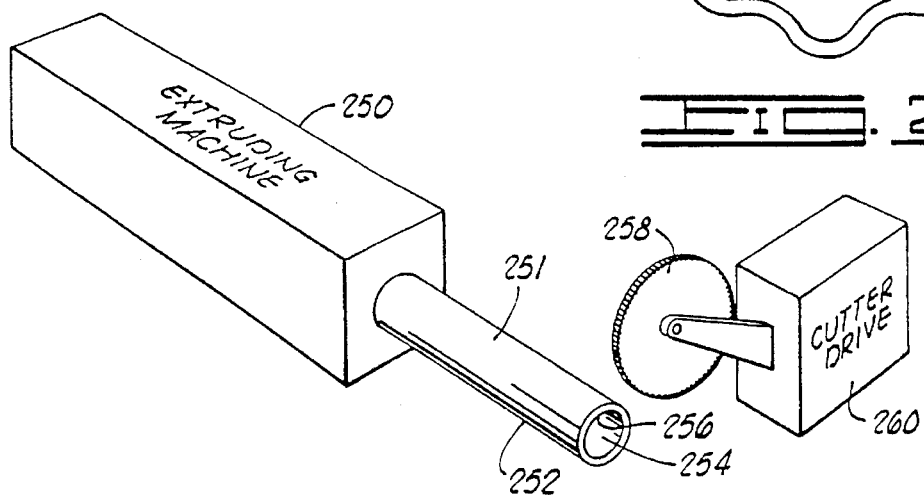
Fig. 25
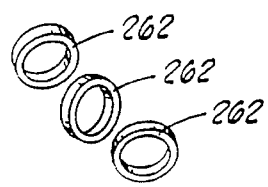

5,535,548

APPARATUS FOR PROVIDING A DECORATIVE COVER FOR A FLOWER POT USING A COLLAR

CROSS REFERENCE TO RELATED APPLICATIONS

This is a divisional of U.S. Ser. No. 08/380,904, filed Jan. 30, 1995, entitled APPARATUS FOR PROVIDING A DECORATIVE COVER FOR A FLOWER POT USING A COLLAR; which is a divisional of U.S. Ser. No. 08/043,506 filed Apr. 6, 1993, entitled APPARATUS FOR PROVIDING A DECORATIVE COVER FOR A FLOWER POT USING A COLLAR; which is a divisional of U.S. Ser. No. 07/773,474 filed on Oct. 9, 1991, entitled APPARATUS FOR PROVIDING A DECORATIVE COVER FOR A FLOWER POT USING A COLLAR, now U.S. Pat. No. 5,231,794, issued Aug. 3, 1993; which is a divisional of U.S. Ser. No. 07/404,955, filed on Sep. 8, 1989, entitled APPARATUS FOR PROVIDING A DECORATIVE COVER FOR A FLOWER POT USING A COLLAR, now U.S. Pat. No. 5,077,937, issued Jan. 7, 1992; which is a continuation-in-part of 07/365,767, filed Jun. 13, 1989, entitled DECORATIVE COVER FOR HANGING BASKET, now abandoned.

Said application 07/404,955 is also a continuation-in-part of U.S. Ser. No. 327,996, filed on Mar. 21, 1989 entitled METHOD OF SHAPING AND HOLDING A SHEET OF MATERIAL ABOUT A FLOWER POT WITH A COLLAR, now U.S. Pat. No. 4,901,423, issued Feb. 20, 1990; which is a continuation of U.S. Ser. No. 232,541, filed Aug. 11, 1988, titled METHOD OF SHAPING AND HOLDING A SHEET OF MATERIAL ABOUT A FLOWER POT WITH A COLLAR, now U.S. Pat. No. 4,835,834, issued Jun. 6, 1989; which is a continuation of U.S. Ser. No. 876,405, filed on Jun. 20, 1986, entitled FLOWER POT ACCESSORY, now abandoned.

FIELD OF THE INVENTION

The present invention generally relates to the forming of a decorative cover for a flower pot using a collar or collar segments and includes means for making the collars.

BRIEF DESCRIPTION OF THE DRAWINGS

FIG. 7 is a sectional view of another modified flower pot with a sheet of material connected thereto by way of a collar constructed in accordance with the present invention.

FIG. 8 is a top plan view of another collar constructed in accordance with the present invention.

FIG. 9 is a top plan view of another modified collar including the means for holding a card.

FIG. 10 is a top plan view of another modified collar with means for holding a bow.

FIG. 11 is a view of a modified flower pot with a sheet of material secured thereto by way of a collar to provide a decorative cover and with a sleeve removably connected to the flower pot by way of the collar.

FIG. 12 is a view of the modified flower pot of FIG. 11 with the sheet of material secured thereto by way of a collar and with a sleeve removably connected to the decorative cover.

FIG. 22 is a sectional view of a flower pot cover, similar to FIG. 21, but made using a modified collar.

FIG. 23 is a sectional view of a decorative cover, similar to FIGS. 21 and 22, but made using still another modified collar.

FIG. 24 is a top plan view of a modified collar.

FIG. 25 is a schematic view of a system for constructing the collars of the present invention.

BRIEF DESCRIPTION OF THE DRAWINGS

Figure 1:
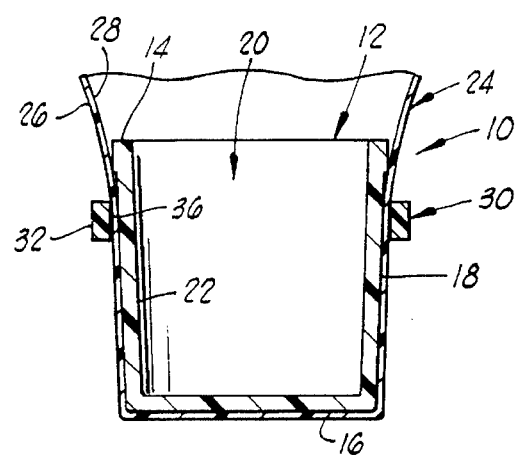
FIG. 1 is a sectional view of a flower pot with a decorative cover connected thereto by way of a collar.

Shown in FIG. 1 and designated therein by the general reference numeral 10 is a decorative cover connected to a flower pot 12.

The flower pot 12 has an upper end 14, a lower end 16, an outer peripheral surface 18 and an object opening 20 formed through the upper end 14 and extending the distance through the flower pot 12 forming an inner peripheral surface 22. The object opening 20 is adapted to receive and accommodate a floral grouping such as potted plants or potted flowers.

The decorative cover comprises a sheet of material 24 having an upper surface 26 and a lower surface 28. The sheet of material may be a cellophane, man-made organic polymer film, paper, metal, foil, cling wrap, burlap, fabric or combinations thereof.

The term "man-made organic polymer film" means a man-made resin such as a polypropylene as opposed to naturally occurring resins such as cellophane.

A man-made organic polymer film is relatively strong and not as subject to tearing (substantially non-tearable), as might be the case with paper or foil. The man-made organic polymer film is a substantially linearly linked processed organic polymer film and is a synthetic linear chain organic polymer where the carbon atoms are substantially linearly linked. Such films are synthetic polymers formed or synthesized from monomers. Further, a relatively substantially linearly linked processed organic polymer film is virtually waterproof which may be desirable in many applications such as wrapping a floral grouping.

The term "floral grouping" as used herein means cut fresh flowers, artificial flowers, other fresh and/or artificial plants or other floral materials and may include other secondary plants and/or ornamentation which add to the aesthetics of the overall floral grouping.

Additionally a relatively thin film of substantially linearly linked processed organic polymer does not substantially deteriorate in sunlight. Processed organic polymer films having carbon atoms both linearly linked and cross-linked, and some cross-linked polymer films, also may be suitable for use in the present invention provided such films are substantially flexible and can be made in a sheet-like format for wrapping purposes consistent with the present invention.

The term "cling wrap" as used herein means any material which is capable of connecting to the sheet of material and/or itself upon contacting engagement during the wrapping process and is wrappable about an item whereby portions of the cling material contactingly engage and connect to other portions of the wrapping material for generally securing the sheet of material wrapped about at least a portion of the item. This connecting engagement is preferably temporary in that the wrapping material may be easily removed without tearing same, i.e., the cling material "clings" to the wrapping material. A wrapping material which remains securely connected to and about the wrapped item until the wrapping material is torn therefrom. The cling material is constructed and treated if necessary, from polyethylene such as Cling Wrap made by GladN, First Brands Corporation, Danbury, Conn. The thickness of the cling material will, in part, depend upon the thickness of the sheet of material utilized, i.e., generally, the thicker and therefore heavier sheet of material may require a thicker and therefore stronger cling material. The cling material will range in thickness from less than about 0.2 mils to about 10 mils, and preferably less than about 0.5 mils to about 2.5 mils and most preferably from less than about 0.6 mils to about 2 mils. However, any thickness of cling material may be utilized in accordance with the present invention which permits the cling material to function as described herein.

Figure 2:
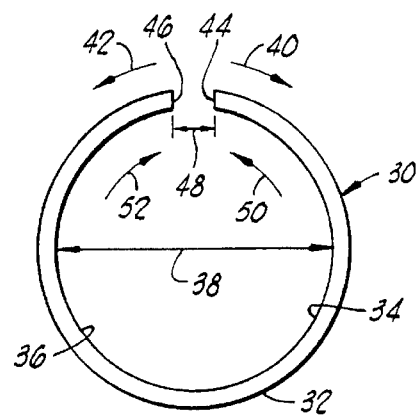
FIG. 2 is a top plan view of a collar constructed in accordance with the present invention.

Shown in FIGS. 1 and 2 is a collar 30 constructed in accordance with the present invention.

As shown in FIGS. 1 and 2, the collar 30 is constructed of a relatively rigid material, such as a metal or plastic material, and, preferably, the material also is such that the collar 30 is resilient. The collar 30 has an outer peripheral surface 32 and an opening 34 formed through a portion thereof providing or forming an inner peripheral surface 36.

The collar 30 is generally circularly shaped and the opening 34 has a size or diameter 38 in a closed position of the collar 30, as shown in FIG. 2. As mentioned before, the collar 30 is resilient and the collar 30 is movable from the closed position (shown in FIG. 2) in directions 40 and 42 to an opened position wherein the size (diameter 38) of the opening 34 is increased.

In this particular embodiment of the collar 30, the collar 30 has a first end 44 and a second end 46. The first and the second ends 44 and 46 are spaced a distance 48 apart in the closed position of the collar 30.

The first and the second ends 44 and 46 are moved in the directions 40 and 42 for moving the collar 30 from the closed position to the opened position, the first and the second ends 44 and 46 being moved generally apart as the collar 30 is moved from the closed to the opened position. When the collar 30 is in the opened position and the collar 30 is released, the resilient nature of the collar 30 springs the ends 44 and 46 generally toward each other in directions 50 and 52 moving the collar 30 back to the closed position. The distance between the ends 44 and 46 increases as the collar 30 is moved from the closed to the opened position and the distance between the ends 44 and 46 decreases as the collar 30 is moved from the opened to the closed position.

In operation, the sheet of material 24 is formed and extended about the outer peripheral surface 18 of the flower pot 12. The collar 30 is moved from the closed position to the opened position, thereby increasing the size (diameter) of the opening 34 so that the flower pot 12 with the sheet of material 24 disposed thereabout can be inserted through the opening 34 and the collar 30. The size (diameter of the opening 34) in the opened position of the collar 30 is larger than the size (diameter) of the outer peripheral surface 18 of the flower pot 12 to permit the collar 30 to be easily disposed about the outer peripheral surface 18 of the flower pot 12 with the sheet of material 24 disposed thereabout. The collar 30 is positioned on the flower pot 12 with the sheet of material 24 disposed thereabout and the collar 30 is released, thereby moving the collar 30 from the opened to the closed position. In the closed position, the opening 34 in the collar 30 has a size (diameter) slightly smaller than the size (diameter) formed by the outer peripheral surface 18 of the flower pot 12 so that the collar 30 clampingly engages the flower pot 12 with the sheet of material 24 disposed thereabout. The collar 30 clamps the sheet of material 24 to the outer peripheral surface 18 of the flower pot 12, thereby securing the sheet of material 24 to the flower pot 12 to provide the decorative cover 10.

EMBODIMENT OF FIG. 3

Figure 3:
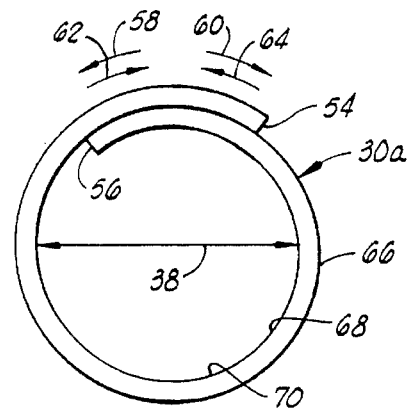
FIG. 3 is a top plan view of a modified collar constructed in accordance with the present invention.

Shown in FIG. 3 is a modified collar 30a. The collar 30a is generally circularly shaped and constructed of a relatively rigid, resilient material in the manner like that described before with respect to the collar 30.

The collar 30a has a first end 54 and a second end 56. A portion of the collar 30a, generally near the first end 54 thereof overlaps a portion of the collar 30a generally near the second end 56 thereof. The first and the second ends 54 and 56 are moveable in directions 58 and 60 to move the collar 30a from the closed position (shown in FIG. 3) to an opened position for increasing the size (diameter 38). The ends 54 and 56 are also movable in directions 62 and 64 for moving the collar 30a from the opened position to the closed position. It should be noted that the overlapping portions of the first and the second ends 54 and 56 remain overlapped in the opened and the closed positions of the collar 30a.

The collar 30a has an outer peripheral surface 66 and an opening 68 formed through a portion thereof forming or providing an inner peripheral surface 70.

In operation, the sheet of material 24 is placed about the flower pot 12. The collar 30a is moved from the closed position to the opened position. In the opened position, the collar 30a is positioned about the outer peripheral surface 18 of the flower pot 12 with the sheet of material disposed thereabout. The collar 30a then is released and moved to the closed position for clamping the sheet of material 24 to the outer peripheral surface 18 of the flower pot 12.

EMBODIMENT OF FIG. 4

Figure 4:
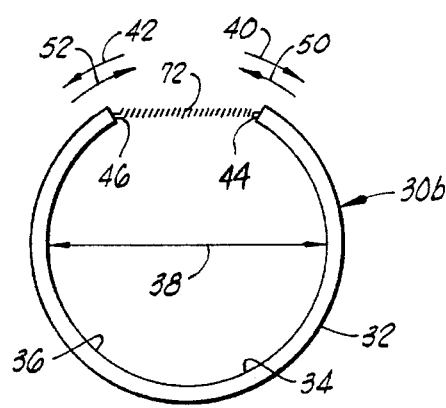
FIG. 4 is a top plan view of another modified collar constructed in accordance with the present invention.

Shown in FIG. 4 is another modified collar 30b which is constructed exactly like the collar 30 shown in FIG. 2, except the collar 30b also includes a spring 72 which is connected to the first and the second ends 44 and 46 of the collar 30b. The spring 72 biases the collar 30b toward the closed position, thereby providing additional assurance that the collar 30b will be moved to the closed position for clamping the sheet of material 24 to the outer peripheral surface 18 of the flower pot 12. It should be noted that the spring 72 comprises a spring means which may be a mechanical spring as shown in FIG. 4 or a rubber band or any other means for biasing the collar 30b from the opened to the closed position.

EMBODIMENT OF FIG. 5

Figure 5:
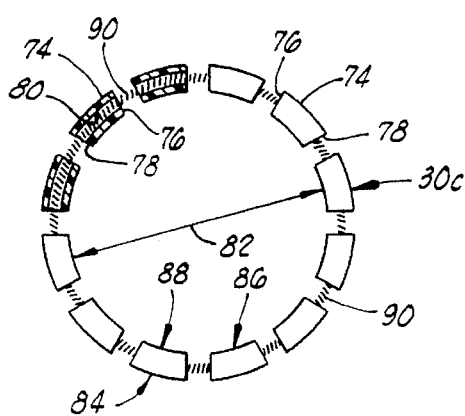
FIG. 5 is a top plan, partial sectional view of yet another modified collar constructed in accordance with the present invention.

Shown in FIG. 5 is another modified collar 30c. The collar 30c comprises a plurality of collar segments 74. Each of the collar segments 74 is identical in construction and only two of the collar segments 74 are designated with a reference numeral in FIG. 5.

Each collar segment has opposite ends 76 and 78 and an opening 80 extending therethrough intersecting the opposite ends 76 and 78 thereof. The collar segments 74 are disposed in an end to end relationship to form a generally circularly shaped collar 30c having a size (diameter 82). The collar 30c has an outer peripheral surface 84 with an opening 86 formed through a portion thereof forming or providing an inner peripheral surface 88.

A spring 90 is disposed and extended through the openings 80 and the collar segments 74 for connecting the collar segments 74 in an assembled position to form the collar 30c. The spring 90 permits the collar segments 74 to be moved generally apart for increasing the opening 86 in the collar 30c and for moving the collar 30c to the opened position. The spring 90 resiliently biases the collar segments 74 from the opened position to the closed position (shown in FIG. 5).

The collar segments 74 are moved to the opened position and the collar 30c is disposed about the outer peripheral surface 18 of the flower pot 12 with the sheet of material already disposed about the outer peripheral surface 18 of the flower pot 12. The collar segments 74 are then released and the spring 90 biases the collar segments 74 to the closed position for clampingly engaging the sheet of material 24 and clamping the sheet of material 24 to the flower pot 12 to provide the decorative cover in a manner like that described before with respect to the decorative cover 10 shown in FIG. 1.

EMBODIMENT OF FIG. 6

Figure 6:
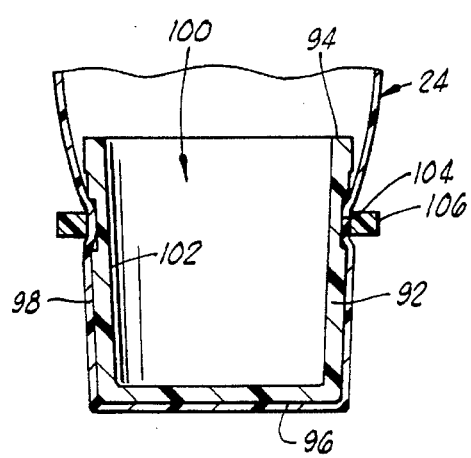
FIG. 6 is a sectional view of a modified flower pot with a sheet of material secured thereto by way of a collar to provide a decorative cover.

Shown in FIG. 6 is a flower pot 92 having an upper end 94, a lower end 96, an outer peripheral surface 98 and an object opening 100 extending a distance therethrough intersecting the upper end 94 thereof and forming or providing an inner peripheral surface 102. The object opening 100 is sized and shaped to accommodate a floral grouping such as a potted plant or potted flowers for example in a manner like that described before with respect to the flower pot 12.

A groove 104 is formed in the outer peripheral surface 98 of the flower pot 92, generally near the upper end 94 thereof. The groove 104 extends circumferentially about the outer peripheral surface 98. The groove 104 provides a snap means, for reasons which will be made apparent below.

A collar 106 is disposed about the outer peripheral surface of the flower pot 92 with a sheet of material 24 already disposed about the outer peripheral surface 98 of the flower pot 92. The collar 106 is moved to a position wherein the collar 106 engages the groove 104 and is disposed in the groove 104, thereby securing the sheet of material 24 to the outer peripheral surface 98 of the flower pot 92 to provide a decorative cover. The collar 106 and groove 104 provide a more secure means for positioning the collar 106 on the flower pot 92.

The collar 106 may be constructed in the manner like that described before with respect to the collar 30 or the collar 30a or the collar 30b or the collar 30c or the collar shown in FIG. 8 and described below.

EMBODIMENT OF FIG. 7

Shown in FIG. 7 is a flower pot 116 having an upper end 118, a lower end 120, an outer peripheral surface 122 and an object opening 124 formed through a portion thereof intersecting the upper end 118 and extending a distance therethrough thereby forming or providing an inner peripheral surface 126. The object opening 124 is adapted and shaped to provide and accommodate a floral grouping such as a potted plant or potted flowers in a manner for reasons like that described before with respect to the flower pot 12.

A modified collar 30e is snappingly connected to the outer peripheral surface 122 of the flower pot 116. The collar 30e has an outer peripheral surface 128 and an opening 130 extending through a portion thereof forming an inner peripheral surface 132. A groove 134 is formed in the inner peripheral surface 132 of the collar 30e. The groove 134 extends circumferentially about the inner peripheral surface 132.

A ridge 136 is formed on the outer peripheral surface 122 of the flower pot 116. The ridge 136 extends circumferentially about the outer peripheral surface 122 of the flower pot 116. The ridge 136 cooperates to form a snap means for snapping the collar 30e into position on the flower pot 116.

In operation, the sheet of material 24 is placed about the outer peripheral surface 122 of the flower pot 116. The collar 30e is moved to the opened position and the flower pot 116 is disposed through the opening 130 and the collar 30e. The collar 30e is moved onto the flower pot 116 to a position wherein the collar 30e snaps onto the ridge 136 on the flower pot 116, the ridge 136 being disposed in the groove 134 thereby securing the collar 30e to the flower pot 116 and connecting the sheet of material 24 to the flower pot 116 to provide a decorative cover therefore.

The collar 30e may be constructed like the collars 30, 30a, 30b, 30c or 30d, except, in each instance, the groove 134 must be formed in the inner peripheral surface of the collar.

EMBODIMENT OF FIG. 8

Shown in FIG. 8 is another modified collar 30d which is constructed of relatively rigid, yet resilient material. The collar 30d has an outer peripheral surface 108 and an opening 110 formed through a portion thereof, thereby providing or forming an inner peripheral surface 112. The opening 110 in the collar 30d has a size (diameter 114). The diameter 114 of the collar 30d is about the same or slightly smaller than the diameter formed by the outer peripheral surface of a flower pot, such as the flower pot 92 shown in FIG. 6. The collar 30d particularly is adapted to be used with the flower pot 92 shown in FIG. 6.

In operation, the sheet of material 24 is disposed about the outer peripheral surface 98 of the flower pot 92 and the flower pot 92 with the sheet of material 24 disposed thereabout is moved through the opening 110 and the collar 30d. The collar 30d is flexible enough to expand to permit the collar 30d to be forcibly moved along the outer peripheral surface of the flower pot 92 until the collar 30d is snapped into the groove 104 formed in the outer peripheral surface 98 of the flower pot 92, thereby securing the sheet of material 24 to the flower pot 92 for providing the decorative cover.

EMBODIMENT OF FIG. 9

Shown in FIG. 9 is a collar 30f which is constructed exactly like the collar 30a shown in FIG. 3 and described before, except the collar 30f includes a card holder 138 connected to the outer peripheral surface 66. The card holder 138 comprises a tab 140 secured to the outer peripheral surface 66 of the collar 30f. The tab 140 extends a distance outwardly from the outer peripheral surface 66. A card receiving slot 142 is formed in the tab 140. The card receiving slot 142 is sized to receive a card 144 such as a greeting card or a care card (instructions relating to the care of a plant). The card receiving slot 142 is slightly smaller than the card 144 so that the card 144 interferingly fits in the card receiving slot 142 and is held in place in the card receiving slot 142.

The card holder 138 also could be connected onto the outer periphery of any of the other collars such as the collars 30, 30a, 30b, 30c, 30d and 30e or any of the other collars described herein.

EMBODIMENT OF FIG. 10

Shown in FIG. 10 is a modified collar 30g. The collar 30g is constructed exactly like the collar 30a described before, except the collar 30g includes a bow holder 146 secured to the outer peripheral surface 66 of the collar 30g. A bow 148 is connected to the bow holder 146. The bow holder 146 is adapted for holdingly supporting the bow 148. The bow holder 146 could be constructed similar to the card holder 138 shown in FIG. 9 and described before so that portion of the bow interferingly fits in the bow receiving slot (card receiving slot 142).

EMBODIMENT OF FIG. 11

Shown in FIG. 11 is a flower pot 150 having an upper end 152, a lower end 154, an outer peripheral surface 156 and an object opening 158 extending therethrough intersecting the upper end 152 and extending the distance therein forming an inner peripheral surface 160. The object opening 158 is size adapted to receive a floral grouping such as a potted plant or flower in the manner like that described before with respect to the flower pot 12. A modified ridge 136a is formed on the outer peripheral surface 156 of the flower pot 150. The ridge 136a extends circumferentially about the outer peripheral surface 156 of the flower pot 150.

A portion of the flower pot 150 generally near the upper end 152 thereof is flared outwardly at an angle to form a flared portion 162. The length and the angle of the flared portion 162 may be adjusted and varied to control the angle at which the sheet of material 24 extends from the upper end 152 of the flower pot 150.

A modified collar 30h is snappingly secured to the flower pot 150. The collar 30h is constructed like the collar 30d shown in FIG. 8 described in detail before, except the collar 30h includes a modified groove 134h shaped to mate with the modified ridge 136a.

A sleeve 164 constructed of a relatively thin, flexible sheet of preferably transparent material is extended about a floral grouping 163 which extends upwardly from the upper end 152 of the flower pot 150. The sleeve 164 encompasses the floral grouping and the ends of the sleeve 164 extend a distance along the outer peripheral surface 156 of the flower pot 150 generally near the upper end 152 thereof. More particularly, the ends of the sleeve 164 extend a distance generally over the ridge 136a formed in the flower pot 150.

In operation, the sleeve 164 is positioned over the floral grouping 163 and portions of the ends of the sleeve are positioned generally along the outer peripheral surface 156 of the flower pot 150 and over the ridge 136a. The sheet of material 24 is then positioned about the outer peripheral surface 156 of the flower pot 150 and portions of the sheet of material 24 extend generally over the ridge 136a. The collar 30h is moved to the opened position and slipped over the outer peripheral surface 156 of the flower pot 150. The collar 30h is moved along the outer peripheral surface 156 to a position wherein the collar 30h is snapped onto the ridge 136a with the ridge 136a extending into the groove 134h. The collar 30h thus secures the sleeve 164 and the sheet of material 24 to the flower pot 150.

The sleeve 164 generally is provided to protect flowers during shipment or the like and, after shipment, the sleeve 164 generally is removed. To remove the sleeve 164, an individual simply slips the sleeve 164 out from between the collar 30h and the outer peripheral surface 156 of the flower pot 150.

EMBODIMENT OF FIG. 12

Shown in FIG. 12 is the flower pot 150 with the sheet of material 24 secured thereto by way of the collar 30h in a manner exactly like that described before with respect to FIG. 11, except, in this embodiment, a modified sleeve 164a is removably connected to an outer peripheral surface 166 of the sheet of material 24. The sleeve 164a may be connected to an outer peripheral surface 166 (FIG. 11) by way of a perforated line 168 or, in lieu of the perforated line 168, a tear strip may be utilized or the sleeve 164a may be adhesively connected to the outer peripheral surface 166 of the sheet of material 24. In any event, the sleeve 164a is removably connected to the sheet of the material 24 so that the sleeve 164a may be removed from the sheet of material 24 thereby leaving the decorative cover formed by the sheet of material 24 and the collar 30h.

EMBODIMENT OF FIG. 13

Figure 13:
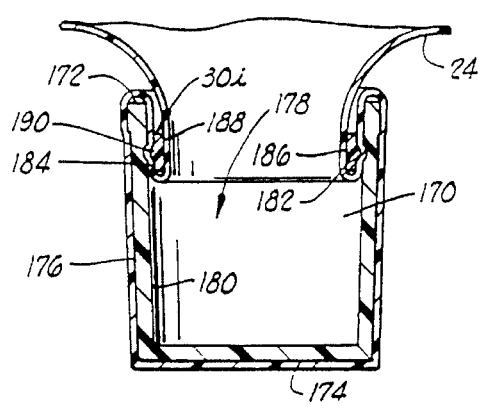
FIG. 13 is a sectional view of another modified flower pot with a sheet of material secured thereto by way of a collar to provide a decorative cover.

Shown in FIG. 13 is a flower pot 170 having an upper end 172, a lower end 174, an outer peripheral surface 176 and an object opening 178 extending the distance therethrough intersecting the upper end 172 thereof and forming or providing an inner peripheral surface 180. A groove 182 is formed on the inner peripheral surface 180 of the flower pot 170. The groove 182 extends circumferentially about the inner peripheral surface 180 of the flower pot 170.

A collar 30i is disposed in the object opening 179 and snappingly connected to the groove 182. The collar 30i has an outer peripheral surface 184 and an opening 186 formed through a portion thereof forming or providing an inner peripheral surface 188.

A ridge 190 is formed on the outer peripheral surface 184 of the collar 30i. The ridge 190 extends circumferentially about the outer peripheral surface 184 of the collar 30i and the ridge 190 extends a distance generally outwardly from the outer peripheral surface 184 of the collar 30i. The ridge 190 is shaped to matingly fit the groove 182.

In operation, the sheet of material 24 is extended about the outer peripheral surface 176 of the flower pot 170 and over the upper end of the flower pot 170. The sheet of material further is extended downwardly along the inner peripheral surface 180 of the flower pot 170 and over the groove 182. In this position of the sheet of material, the collar 30i is disposed in the object opening and moved to a position wherein the ridge 190 in the collar 30i snappingly engages the groove 182 in the flower pot 170 to secure the sheet of material 24 to the flower pot 170. The sheet of material 24 further is extended over the collar 30i upwardly and outwardly from the object opening 178 to provide the decorative cover.

EMBODIMENT OF FIG. 14

Figure 14:
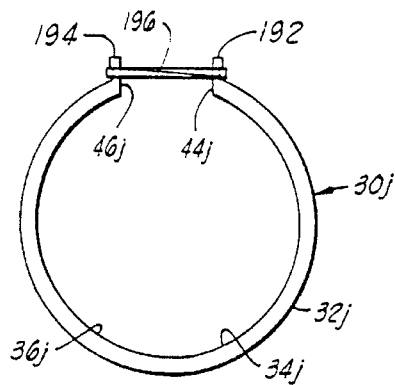
FIG. 14 is a top plan view of still another modified collar.

Shown in FIG. 14 is a collar 30j which is constructed exactly like the collar 30 shown in FIG. 2 and described before, except the collar 30j includes a flange 192 formed on the outer peripheral surface 32j and extending the distance therefrom, generally near the end 44j thereof, and a flange 194 formed on the outer peripheral surface 32j and extending outwardly a distance therefrom, generally near the end 46j thereof. A rubber band 196 is extended about the flanges 192 and 194. The rubber band 196 provides a spring means for biasing the collar 30j to the closed position in a manner similar to that described before with respect to the spring 72 shown in FIG. 4.

EMBODIMENT OF FIG. 15

Figure 15:
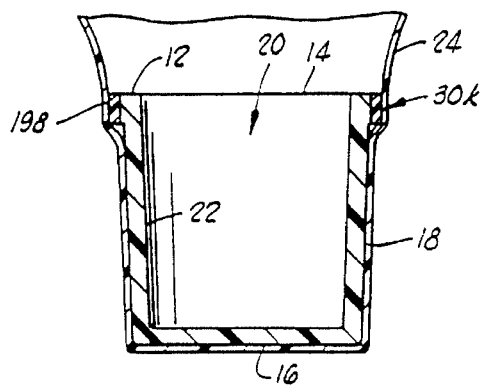
FIG. 15 is a view of a decorative cover made using a collar constructed in accordance with the present invention, shown in FIG. 15 secured to a flower pot.

Shown in FIG. 15 is the flower pot 12 which is constructed like the flower pot 12 shown in FIG. 1 and described in detail before.

A collar 30k is connected to the outer peripheral surface 18 of the flower pot 12. The collar 30k may be constructed like the collars 30, 30a, 30b, 30c, 30f or 30g described before. The sheet of material 24 is secured to the outer peripheral surface of the collar 30k via adhesive 198. The sheet of material 24 is adhesively connected to the collar 30k.

In operation, the collar 30k is moved to the opened position. The collar 30k then with the sheet of material 24 connected thereto is moved to the opened position and moved over the outer peripheral surface 18 of the flower pot 12 until the collar 30k has been positioned in a predetermined position. The collar 30k is then released and the collar 30k is moved to the closed position wherein the collar 30k grips the outer peripheral surface 18 of the flower pot 12 to secure the collar 30k with the sheet of material 24 connected thereto to the flower pot 12 and provide the decorative cover therefor.

EMBODIMENT OF FIG. 16

Figure 16:
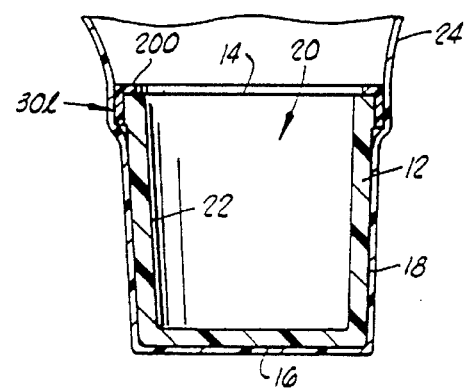
FIG. 16 is a sectional view of a flower pot with a decorative cover made using a collar constructed in accordance with the present invention disposed thereabout.

Shown in FIG. 16 is a flower pot 12 which is constructed exactly like the flower pot 12 shown in FIGS. 1 and 15 and described in detail before. A collar 30l is grippingly connected to the outer peripheral surface 18 of the flower pot 12. The collar 30l is constructed exactly like the collar 30k except that the collar 30l includes a rim 200 formed on the inner peripheral surface of the collar 30l and extending inwardly into the opening of the collar 30l. The sheet of material 24 is adhesively connected to the outer peripheral surface of the collar 30l.

The collar 30l with the sheet of material 24 secured thereto is moved over the outer peripheral surface of the flower pot 12 to a position wherein the rim 200 overlaps the upper end 14 of the flower pot 12. The collar 30l then is moved to the closed position for grippingly engaging the outer peripheral surface 18 of the flower pot 12, thereby securing the collar 30l and the sheet of material 24 connected thereto to the flower pot 12. The rim 200 engages the upper end 14 of the flower pot 12 and cooperates to position the collar 30l with the sheet of material 24 connected thereto on the flower pot 12.

It should be noted that in lieu of adhesively connecting the sheet of material 24 to the collar 30k or 30l, the sheet of material may be mechanically connected to the collar 30k or 30l such as by stapling or a sheet of material 24 may be heat welded to the collar 30k or 30l or the sheet of material 24 may be connected by any other suitable means to the collar 30k or 30l.

EMBODIMENT OF FIGS. 17, 18 & 19

Figure 17:
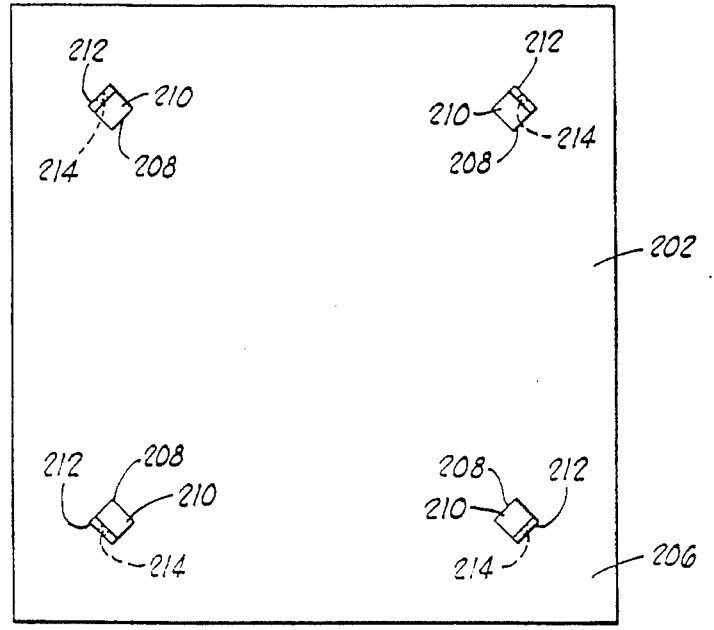
FIG. 17 is a top plan view of a sheet of material with collar segments secured thereto for use in forming the decorative cover for the flower pot.
Figure 18:
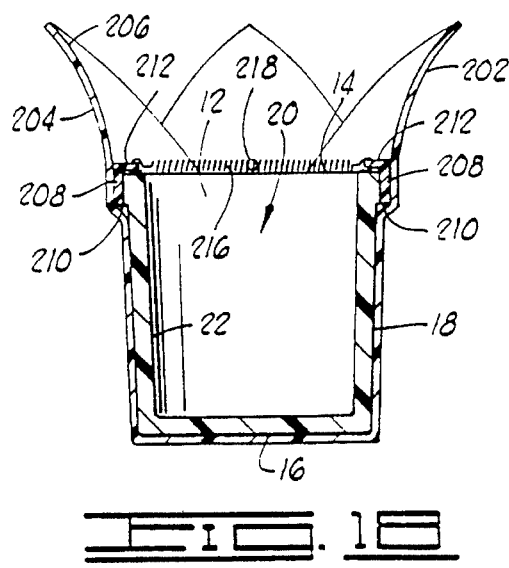
FIG. 18 is a sectional view of a flower pot with a decorative cover secured thereto made using the sheet of material of FIG. 17.

Shown in FIGS. 17 and 18 is a sheet of material 202 having an upper surface 204 and a lower surface 206. The sheet of material 202 is constructed exactly like the sheet of material 24 described in detail before.

At least two collar segments 208 are connected to the lower surface 206 of the sheet of material 202 (four collar segments 208 being shown in FIG. 17). The collar segments 208 are identical in construction. The collar segments 208 are spaced over the lower surface 206 of the sheet of material 202.

Each collar segment 208 includes a base 210 and a flange 212 connected to the base 210 and extending a distance generally upwardly and outwardly from the base 210. A hole 214 is formed through each of the flanges 212. The base 210 of each of the collar segments 208 is secured to the lower surface 206 of the sheet of material 202, such as by adhesively connecting the base 210 to the sheet of material 202.

Figure 19:
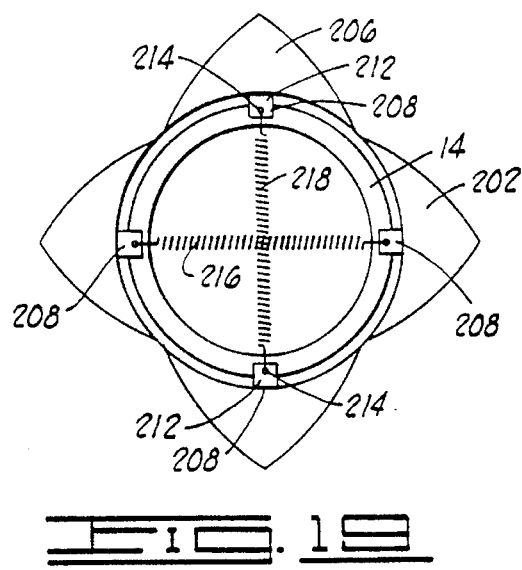
FIG. 19 is a top plan view of the flower pot with the sheet of material of Fibre 17 connected thereto to provide a decorative cover.

The sheet of material 202 with the collar segments 208 secured thereto is extended about the outer peripheral surface 18 of the flower pot 12 (shown in FIGS. 18 and 19) to a position wherein the flanges 212 each extend generally over the upper end 14 of the flower pot 12 and the bases 210 each engage a portion of the outer peripheral surface 18 of the flower pot 12. In this position, two of the flanges 212 are connected by way of a spring 216 with each end of the spring 216 being extended through one of the holes 214 in one of the flanges 212. Another spring 218 connects the remaining two flanges 212 with each end of the spring 218 extending through the hole 214 formed in one of the flanges 212. The springs 216 and 218 cooperate to secure the collar segments 208 to the flower pot 12.

EMBODIMENT OF FIG. 20

Figure 20:
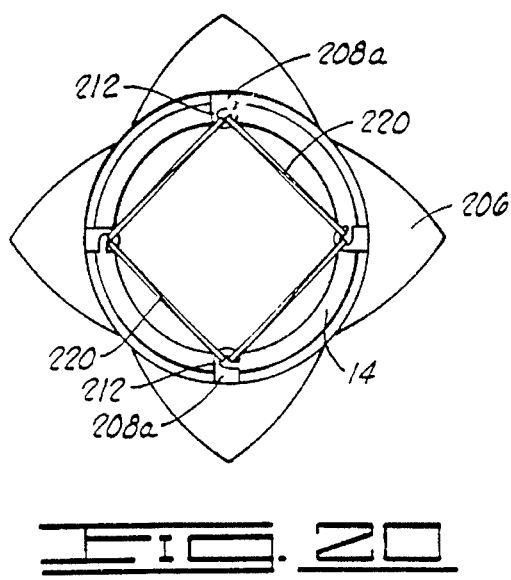
FIG. 20 is a top plan view of a decorative cover made using a sheet of material like the sheet of material in FIG. 17 with modified collar segments secured thereto, the decorative cover being shown in FIG. 20 connected to a flower pot.

Shown in FIG. 20 is the sheet of material 202 with four modified collar segments 208a secured thereto. The collar segments 208a are constructed like the collar segments 208 shown in FIGS. 17, 18 and 19 and described before, except each of the collar segments 208a includes a modified flange 212 which has a hooked shape. After the sheet of material 202 with the collar segments 208a has been positioned on the flower pot 12 in a manner described before in connection with FIGS. 17, 18 and 19, a rubber band 220 is connected to the hook shaped flanges 212 of two of the collar segments 208a to interconnect the collar segments 208a and secure the sheet of material 202 to the flower pot 12, four rubber bands 220 being shown in FIG. 20 with each rubber band 220 being interconnected between two of the collar segments 208a.

EMBODIMENT OF FIG. 21

Figure 21:
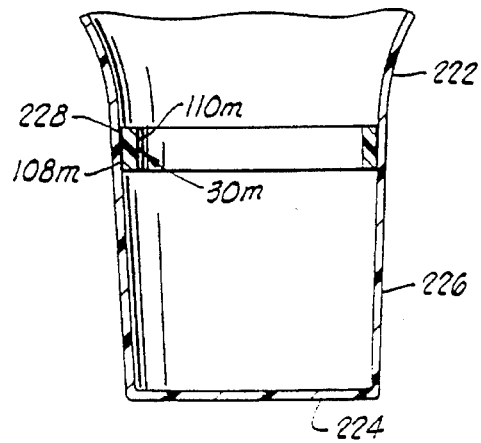
FIG. 21 is a sectional view of a decorative cover made using the collar constructed in accordance with the present invention.

Shown in FIG. 21 is a collar 30m which is constructed exactly like the collar 30e shown in FIG. 7, except the collar 30m does not have to be constructed of a resilient material since the collar 30m does not have to be moved to opened and closed positions in a manner like that described before with respect to the collar 30e. A sheet of material 222 is secured to the outer peripheral surface 108m of the collar 30m. The sheet of material 222 has a thickness and is constructed of a material such that the sheet of material basically maintains its predetermined shape shown in FIG. 21 having a lower end 224 and a base 226 extending upwardly from the lower end 224. After it initially has been formed in this predetermined shape, the sheet of material is connected to the outer peripheral surface 108m of the collar 30m by way of an adhesive 228 or by heat sealing or by any other attachment means such as stapling.

In this embodiment, the collar 30m cooperates to retain the formed shape of the sheet of material 222, the formed shape being that of a decorative cover having the base 226 extending upwardly from the lower end 224. The decorative cover formed with the sheet of material 222 and the collar 30m provides a decorative cover for a flower pot like the flower pot 12. When it is desired to be utilized, the flower pot merely is inserted into the opening in the base 226 of the decorative cover provided by the sheet of material 222.

EMBODIMENT OF FIG. 22

Shown in FIG. 22 is a decorative flower pot cover made from the sheet of material 222 which is constructed exactly like the sheet of material 222 shown in FIG. 21 and described before. The sheet of material 222 is initially formed into a shape of a flower pot cover with the base 226 having the lower end 224.

A modified collar 30n is disposed in the opening in the decorative cover and secured to the decorative cover for cooperating to hold the sheet of material 222 in the form of the decorative cover. The collar 30n is constructed exactly like the collar 30m shown in FIG. 21 and described in detail before. Except, the collar 30n has a plurality of barbs 230 formed on the outer peripheral surface 108n of the collar 30n with each of the barbs 230 being spaced circumferentially about the outer peripheral surface 108n of the collar 30n and extended a distance outwardly from the outer peripheral surface 108n of the collar 30n. When the collar 30n is disposed in the opening in the decorative cover provided by the formed sheet of material 222, the barbs 230 each are pierced through the sheet of material for connecting the collar 30n to the sheet of material 222. The collar 30n cooperates to maintain the sheet of material 222 in the formed shape of a decorative flower pot cover.

EMBODIMENT OF FIG. 23

Shown in FIG. 23 is a sheet of material 232 which is constructed exactly like the sheet of material 222 and formed in the form of a decorative cover having a base 234 with a lower end 236. The decorative cover of FIG. 23 has an upper end 238. The decorative cover of FIG. 23 is shaped to accommodate a flower pot like the flower pot 12 shown in FIG. 1.

A circularly shaped modified collar 30p is connected to the upper end 238 of the sheet of material 232 and the collar 30p extends circumferentially about the upper end 238 of the sheet of material 232. The collar 30p is generally U-shaped in one cross section forming a receiving opening 240. The U shaped collar 30p has a first leg 242 and a second leg 244. The first and second legs 242 and 244 are connected by a connecting portion 246. The first and second legs 242 and 244 are spaced a distance apart and the space between the first and second legs 242 and 244 cooperate to form the receiving space 240.

The portion of sheet of material 232, generally near the upper end 238 thereof, is disposed in the receiving space 240. The collar 30p is constructed so that the legs 242 and 244 are generally in the closed position for clamping the collar 30p to the upper end 238 of the sheet of material 232. To place the collar 30p on the upper end 238 of the sheet of material 232, the legs 242 and 244 are spread apart so that the upper end 238 portion of the sheet of material 232 can be inserted into the receiving opening 240.

EMBODIMENT OF FIG. 24

Shown in FIG. 24 is a modified collar 30a which is constructed exactly like the collar 30e shown in FIG. 7 except the collar 30a has an undulating or scalloped shape. The scalloped shaped collar 30a is adapted to provide a scalloped shaped decorative cover. The collars described herein including the collars 30m, 30n, and 30p also can be scalloped shaped in the manner shown in FIG. 24 with respect to the collar 30a.

It should be noted that, although the sheets of material 222 and 232 have been described herein as being constructed of a relatively rigid material capable of holding the shape of the decorative cover, the sheet of material 222 or 232 could be a relatively flexible material. When constructed of the relatively flexible material, the decorative cover in essence would collapse after the collar has been connected to the sheet of material. The collapsed decorative cover then could be inserted over the outer peripheral surface of the flower pot and then connected to the flower pot to support the decorative cover on the flower pot.

EMBODIMENT OF FIG. 25

Shown in FIG. 25 is a commercially available extruding machine 250 which is capable of extruding a tubular shaped plastic member 251 having an outer peripheral surface 252 and an opening 254 extending therethrough forming an inner peripheral surface 256. The opening 254 in the tubular member 251 is substantially the same shape as the opening in the collar, such as the opening 110 in the collar 30d, for example. The outer peripheral surface 252 in the tubular member 251 is substantially the same shape as the outer peripheral surface in the collar, such as the outer peripheral surface 108 in the collar 30d, for example.

A cutting member 258 connected to a cutter drive 260 is adapted to cuttingly engage the tubular member 251 for cutting an end portion from the tubular member 251, the cut portion forming a collar 262 like the collar 30e shown in FIG. 7.

The apparatus shown in FIG. 25 also can be utilized to extrudingly form the other collars described herein. For example, a sizing clamp could be added which would cycle into a closed position over the tube being extruded before the tube was fully cured or hard for causing an indentation in the tubular member 251 which would serve as a groove in the outer peripheral surface of the collar. In a like manner, a ridge or raised area could be formed by cycling the clamp on the inside of the tubular member 251 prior to the tubular member 251 becoming set or hard. A water spray could be added to the system shown in FIG. 25 for the purpose of cooling the tubular member 251 in an expeditious manner.

Changes may be made in the various parts, elements and assemblies described herein and changes may be made in the steps or sequence of steps of the methods described herein without departing from the spirit and the scope of the invention as defined in the following claims.

Changes may be made in the construction and the operation of the various parts, elements and assemblies described herein and changes may be made in the steps or the sequence of steps of the methods described herein without departing from the spirit and scope of the invention as defined in the following claims.

What is claimed is:

1. An apparatus for forming a decorative cover for a flower pot having a outer peripheral surface comprising:

a sheet of material constructed of a material capable of retaining a shape and the sheet of material being formed generally in the shape of a decorative cover having an upper end and an object opening for receiving the flower pot; and a collar connected to the upper end of the decorative cover for cooperating to retain the sheet of material in the shape of the decorative cover, the collar generally U-shaped in one cross section forming a receiving opening, the upper end of the decorative cover being disposed in the receiving opening.

2. The apparatus of claim 1 wherein the U-shaped collar forms a first leg, a second leg and a connecting portion connecting the first and the second legs, the first and the second legs being spaced a distance apart and the space between the first and second legs cooperating to form the receiving opening.

* * * * *

UNITED STATES PATENT AND TRADEMARK OFFICE
CERTIFICATE OF CORRECTION

PATENT NO. : 5,535,548
DATED : July 16, 1996
INVENTOR(S) : Weder et al.

It is certified that error appears in the above-identified patent and that said Letters Patent is hereby corrected as shown below:

Column 2, line 29, please delete "Fibre 17" and substitute therefor --FIG. 17--.

Column 9, line 1, please delete "object opening 179" and substitute therefor --object opening 178--.

Column 12, line 34, please delete "collar 30a" and substitute therefor --collar 30q--.

Column 12, line 36, please delete "collar 30a" and substitute therefor --collar 30q--.

Column 12, line 37, please delete "collar 30a" and substitute therefor --collar 30q--.

Column 12, line 41, please delete "collar 30a" and substitute therefor --collar 30q--.

Signed and Sealed this

Twenty-sixth Day of November 1996

Attest:

BRUCE LEHMAN

*Attesting Officer*  *Commissioner of Patents and Trademarks*